US008756936B2

(12) United States Patent
Orosa et al.

(10) Patent No.: US 8,756,936 B2
(45) Date of Patent: Jun. 24, 2014

(54) EXHAUST DIFFUSER ADJUSTMENT SYSTEM FOR A GAS TURBINE ENGINE

(75) Inventors: John A. Orosa, Palm Beach Gardens, FL (US); Jason A. Kopko, Jupiter, FL (US)

(73) Assignee: Siemens Aktiengesellschaft, München (DE)

( * ) Notice: Subject to any disclaimer, the term of this patent is extended or adjusted under 35 U.S.C. 154(b) by 348 days.

(21) Appl. No.: 13/276,346

(22) Filed: Oct. 19, 2011

(65) Prior Publication Data

US 2013/0098039 A1 Apr. 25, 2013

(51) Int. Cl.
*F02K 1/78* (2006.01)
*B63H 11/10* (2006.01)

(52) U.S. Cl.
USPC ...................... 60/770; 415/211.2; 239/265.19

(58) Field of Classification Search
USPC ......... 60/770; 239/265.19; 415/1, 211.2, 914, 415/224.5
See application file for complete search history.

(56) References Cited

U.S. PATENT DOCUMENTS

| | | | | |
|---|---|---|---|---|
| 3,058,302 | A * | 10/1962 | Knzyk | 60/264 |
| 5,603,604 | A * | 2/1997 | Norris et al. | 415/208.1 |
| 6,896,475 | B2 * | 5/2005 | Graziosi et al. | 415/1 |
| 7,272,930 | B2 * | 9/2007 | Wiebe et al. | 60/770 |
| 2010/0303607 | A1 | 12/2010 | Orosa | |
| 2011/0056179 | A1 | 3/2011 | Orosa | |
| 2011/0058939 | A1 | 3/2011 | Orosa et al. | |

* cited by examiner

*Primary Examiner* — Hoang Nguyen

(57) ABSTRACT

A turbine exhaust diffuser adjustment system for a gas turbine engine capable of altering the flow of turbine exhaust gases is disclosed. The turbine exhaust diffuser adjustment system may be formed from one or more flow ramps positioned in a flowpath. The flow ramp may include a downstream, radially outward point that extends radially outward further from the ID flowpath boundary than an upstream, radially outward point that is positioned upstream from the downstream, radially outward point. The flow ramp may be adjustable such that an angular position of a radially outer surface of the flow ramp may be adjusted relative to the ID flowpath boundary, thereby enabling the flowpath to be changed during turbine operation to enhance the efficiency of the turbine engine throughout its range of operation.

18 Claims, 4 Drawing Sheets

EXHAUST DIFFUSER ADJUSTMENT SYSTEM FOR A GAS TURBINE ENGINE

FIELD OF THE INVENTION

This invention is directed generally to gas turbine engines, and more particularly to flowpaths in exhaust diffusers in gas turbine engines.

BACKGROUND

Typically, gas turbine engines include a compressor for compressing air, a combustor for mixing the compressed air with fuel and igniting the mixture, and a turbine blade assembly positioned downstream from the combustor for producing power. Turbine exhaust gases are directed downstream and into a diffuser before being exhausted from the gas turbine engine. Diffusers typically operate most efficiently with uniform inlet conditions, such as, flat total pressure radial distributions and low swirl. Nonetheless, when turbine engines are modified to run at higher power levels, the result often is that the turbine exit total pressure profile becomes hub strong. The hub strong pressure profile tends to pull flow away from an exhaust diffuser OD flowpath and cause flow separation at the OD flowpath.

SUMMARY OF THE INVENTION

This invention relates to a turbine exhaust diffuser adjustment system for a gas turbine engine capable of altering the flow of turbine exhaust gases. The turbine exhaust diffuser adjustment system may be formed from one or more flow ramps positioned in a flowpath. The flow ramp may include a downstream, radially outward point that extends radially outward further from an ID flowpath boundary than an upstream, radially outward point that is positioned upstream from the downstream, radially outward point. The flow ramp may be adjustable such that an angular position of a radially outer surface of the flow ramp may be adjusted relative to the ID flowpath boundary, thereby enabling the flow to be redirected from the ID flowpath boundary towards the OD flowpath boundary during turbine operation to enhance the efficiency of the turbine engine throughout its range of operation.

The turbine exhaust diffuser adjustment system may include one or more flowpaths downstream of a turbine assembly. The flowpath may be defined at least in part by a turbine casing forming an OD flowpath boundary and at least in part by a hub forming an ID flowpath boundary. A first flow ramp may be positioned in the at least one flowpath, wherein the first flow ramp includes a downstream, radially outward point that extends radially outward further from the ID flowpath boundary than an upstream, radially outward point that is positioned upstream from the downstream, radially outward point, thereby redirecting at least a portion of the flowpath. In particular, the downstream, radially outward point of the first flow ramp may extend radially outward from a longitudinal axis a distance greater then the upstream, radially outward point. The first flow ramp may be adjustable such that an angular position of a radially outer surface of the first flow ramp may be adjusted relative to the ID flowpath boundary, thereby enabling the flowpath to be redirected during turbine operation.

The first flow ramp may be generally cylindrical about a longitudinal axis of the turbine engine and may extend generally along the longitudinal axis. The first flow ramp may be a ring with a generally conical outer surface. In another embodiment, the first flow ramp may be a ring with a generally outwardly curved outer surface. An inner surface of the first flow ramp may be configured to fit on the ID flowpath boundary. The upstream, radially outward point may be configured to also contact the ID flowpath boundary.

A second flow ramp may be positioned in the one or more flowpaths. The second flow ramp may include a downstream, radially outward point that extends radially outward further from the ID flowpath boundary than an upstream, radially outward point that is positioned upstream from the downstream, radially outward point. In particular, the downstream, radially outward point of the second flow ramp may extend radially outward from a longitudinal axis a distance greater then the upstream, radially outward point of the second flow ramp. The second flow ramp may be positioned downstream from the first flow ramp. The first flow ramp may be positioned on an upstream portion of the hub forming the ID flowpath boundary with a positive slope moving in a downstream direction, and the second flow ramp may be positioned on a downstream portion of the hub forming the ID flowpath boundary with a negative slope moving in a downstream direction. The first flow ramp may also be positioned over a cylindrical ID flowpath boundary having no slope. The second flow ramp may be adjustable such that an angular position of a radially outer surface of the second flow ramp may be adjusted relative to the ID flowpath boundary, thereby enabling the flow to be redirected from the ID flowpath boundary towards the OD flowpath boundary.

The second flow ramp may be generally cylindrical about a longitudinal axis of the turbine engine and may extend generally along the longitudinal axis. The first flow ramp may be a ring with a generally conical outer surface. An inner surface of the second flow ramp may be configured to fit on the ID flowpath boundary. The upstream, radially outward point may be configured to also contact the ID flowpath boundary.

An advantage of the turbine exhaust diffuser adjustment system is that, during use, one or more flow ramps may be used to redirect the flow in the flow path defined by the ID flowpath boundary and the OD flowpath boundary, as modified by one or more flow ramps.

Another advantage of the turbine exhaust diffuser adjustment system is that the performance of a diffuser operating with a hub strong pressure profile and low swirl can be improved through use of one or more flow ramps that redirects a portion of the flow towards the OD flowpath boundary to relieve separation in the flow at the OD flowpath boundary.

Yet another advantage of the turbine exhaust diffuser adjustment system is that one or more flow ramps may help balance the downstream radial total pressure profile.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
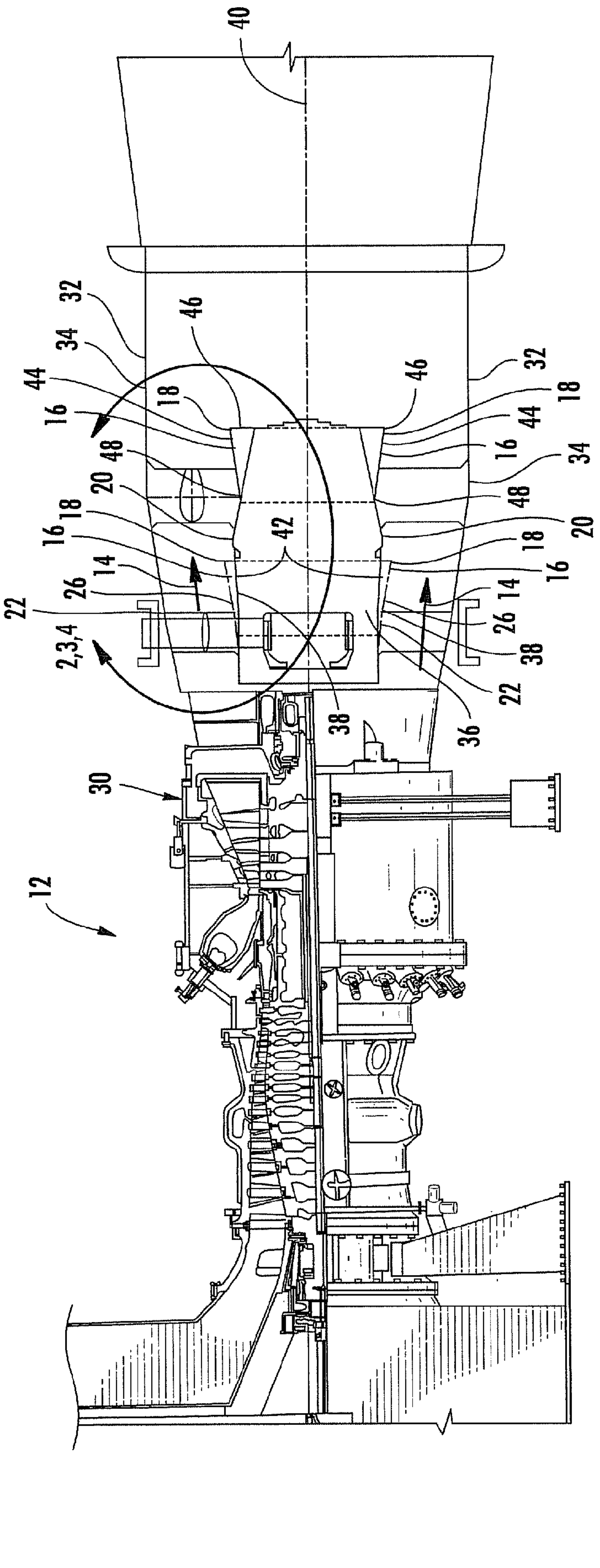
FIG. 1 is a partial cross-section of a turbine engine having features according to the instant invention.

As shown in FIGS. 1-6, this invention is directed to a turbine exhaust diffuser adjustment system 10 for a gas turbine engine 12 capable of altering the flow 14 of turbine exhaust gases. The turbine exhaust diffuser adjustment system 10 may be formed from one or more flow ramps 16 positioned in a flowpath to alter the flow of exhaust gases. The flow ramp 16 may be a generally cylindrical body for redirecting exhaust gas flow. The flow ramp 16 may include a downstream, radially outward point 18 that extends radially outward further from an ID flowpath boundary 20 than an upstream, radially outward point 22 that is positioned upstream from the downstream, radially outward point 18. The flow ramp 16 may be adjustable such that an angular position 24 of a radially outer surface 26 of the flow ramp 16 may be adjusted relative to the ID flowpath boundary 20, thereby enabling the flowpath 28 to be changed, such as by being increased or decreased, during turbine operation to enhance the efficiency of the turbine engine 12 throughout its range of operation.

Figure 2:
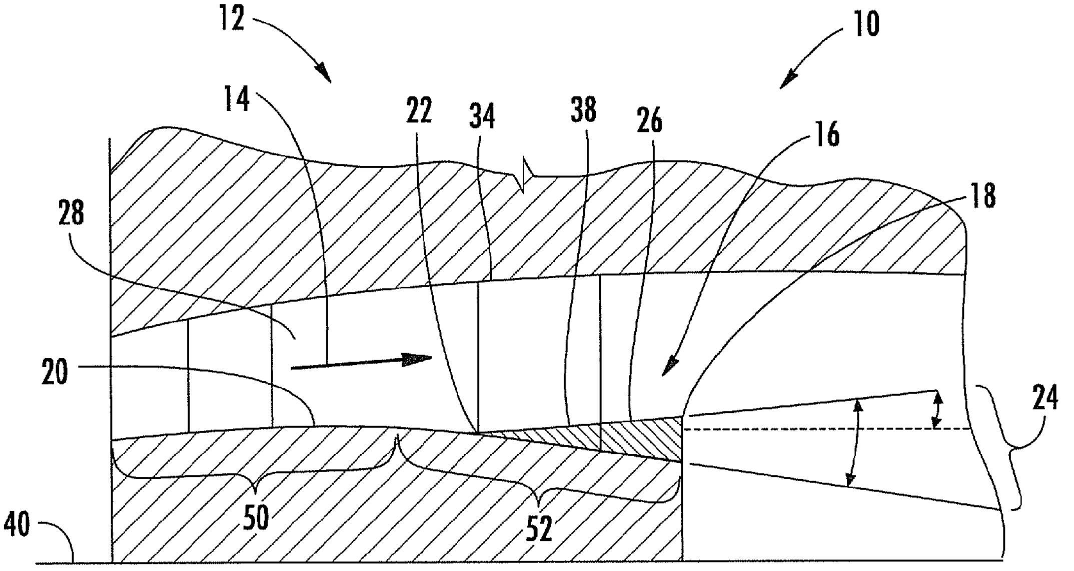
FIG. 2 is a detailed side view of a turbine exhaust diffuser adjustment system with a single flow ramp taken in FIG. 1 at detail 2.
Figure 3:
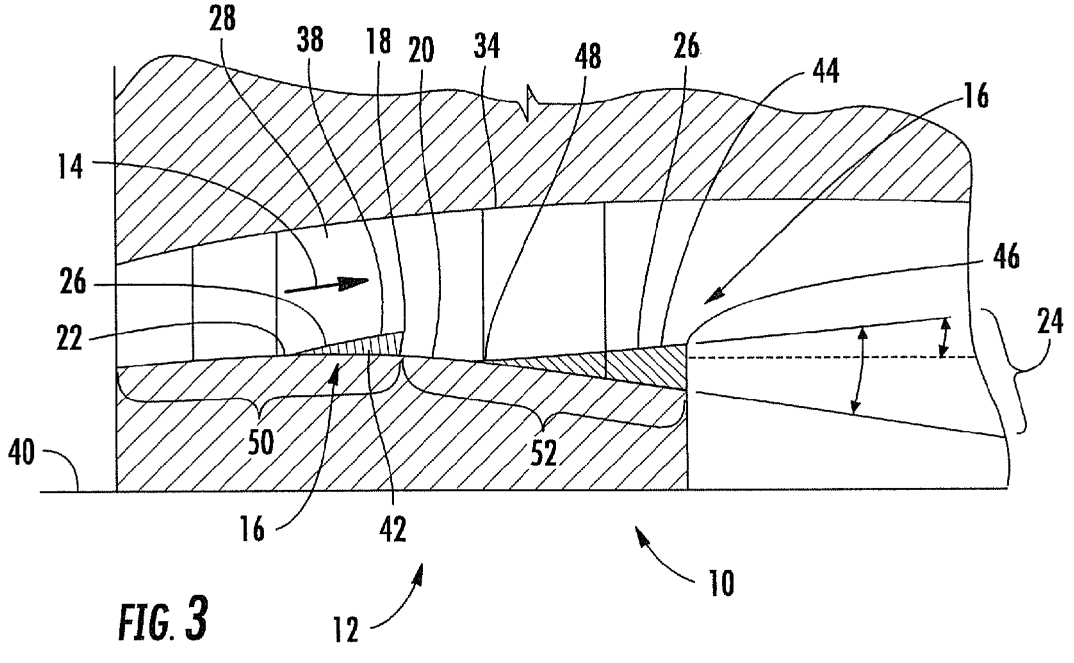
FIG. 3 is a detailed side view of another embodiment of the turbine exhaust diffuser adjustment system with multiple flow ramps taken in FIG. 1 at detail 3.

As shown in FIGS. 2 and 3, the turbine exhaust diffuser adjustment system 10 for the gas turbine engine 12 may include one or more flowpaths 28 downstream of one or more turbine assemblies 30. The flowpath 28 may be defined at least in part by a turbine casing 32 forming an OD flowpath boundary 34. The flowpath 28 may also be defined in part by a hub 36 forming the ID flowpath boundary 20. The hub 36 and turbine casing 32 may be generally cylindrical. The turbine exhaust diffuser adjustment system 10 may include one or more flow ramps 16. A first flow ramp 38 may be positioned in the flowpath 28. The first flow ramp 38 may include a downstream, radially outward point 18 that extends radially outward further from the ID flowpath boundary 20 than an upstream, radially outward point 22 that is positioned upstream from the downstream, radially outward point 18. In particular, the downstream, radially outward point 18 of the first flow ramp 38 may extend radially outward from a longitudinal axis 40 a distance greater then the upstream, radially outward point 22. As such, the first flow ramp 38 redirects the flow 14 within the flowpath 28 with a radially outward vector to more equally spread the flow 14 between the ID and OD flowpath boundaries 20, 34.

Figure 4:
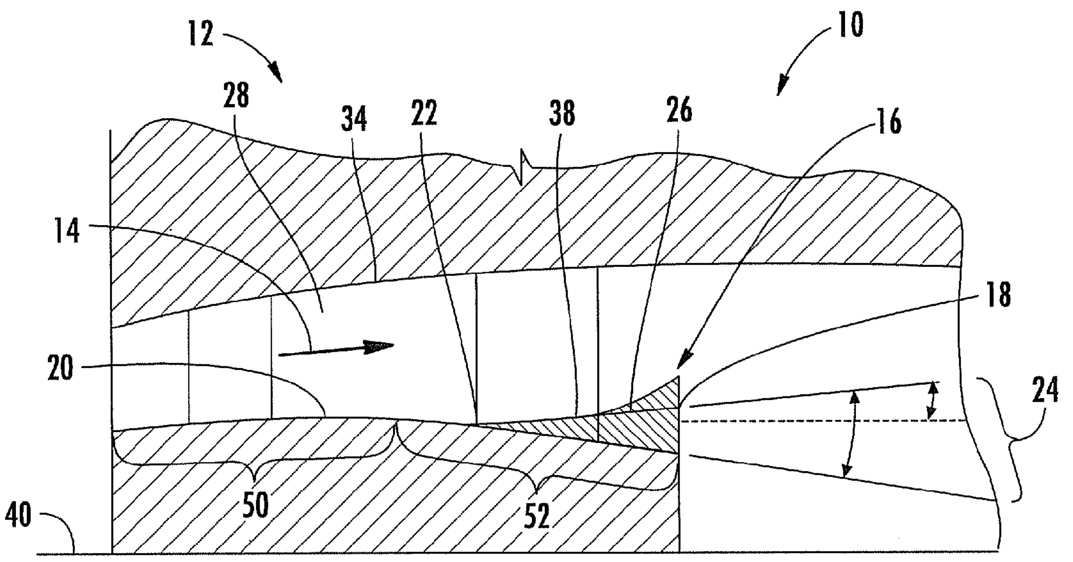
FIG. 4 is a detailed side view of yet another embodiment of the turbine exhaust diffuser adjustment system with a curved outer surface taken in FIG. 1 at detail 4.

As shown in FIG. 4, the first flow ramp 38 may be generally cylindrical about a longitudinal axis 40 of the turbine engine 12 and may extend generally along the longitudinal axis 40. The first flow ramp 38 may be a ring with a generally conical outer surface 26. An inner surface 42 of the first flow ramp 38 may be configured to fit on the ID flowpath boundary 20. The upstream, radially outward point 18 may be configured to also contact the ID flowpath boundary 20, as shown in FIGS. 2 and 3. In another embodiment, as shown in FIG. 4, the first flow ramp 38 may be a ring with a generally outwardly curved outer surface 26.

Figure 6:
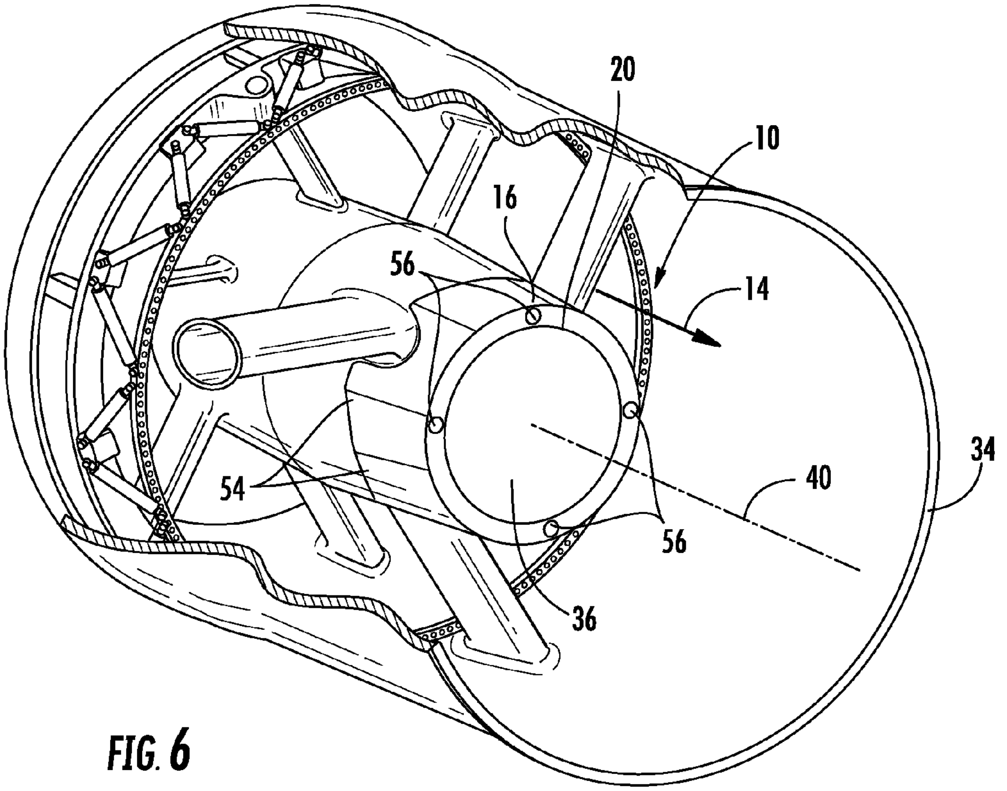
FIG. 6 a perspective view of a flow ramp of the turbine exhaust diffuser adjustment system with an actuator system configured to assist adjustment of the flow ramp.

The first flow ramp 38 may be adjustable such that an angular position 24 of the radially outer surface 26 of the first flow ramp 38 may be adjusted relative to the ID flowpath boundary 20, thereby enabling the flowpath 28 to be redirected during turbine operation and changing the flow 14 through the flowpath 28 to increase the efficiency of a downstream diffuser. In one embodiment, the flow ramp 16 may be formed from a plurality of overlapping flaps 54, as shown in FIG. 6, whose angular position is controlled with one or more actuators 56, which may be, but are not limited to being, a hydraulic actuator. The first flow ramp 38 may be adjustable with any component or multiple components capable of changing the angular position 24 of the radially outer surface 26 while the turbine engine is at rest and under operating conditions. The first flow ramp 38 may be formed from any appropriate configuration.

The turbine exhaust diffuser adjustment system 10 may also include a second flow ramp 44 positioned in the flowpath 28. The second flow ramp 44 may include a downstream, radially outward point 46 that extends radially outward further from the ID flowpath boundary 20 than an upstream, radially outward point 48 that is position upstream from the downstream, radially outward point 46. The downstream, radially outward point 46 of the flowpath 28 may extend radially outward from the longitudinal axis 40 a distance greater then the upstream, radially outward point 48 of the flowpath 28.

Figure 5:
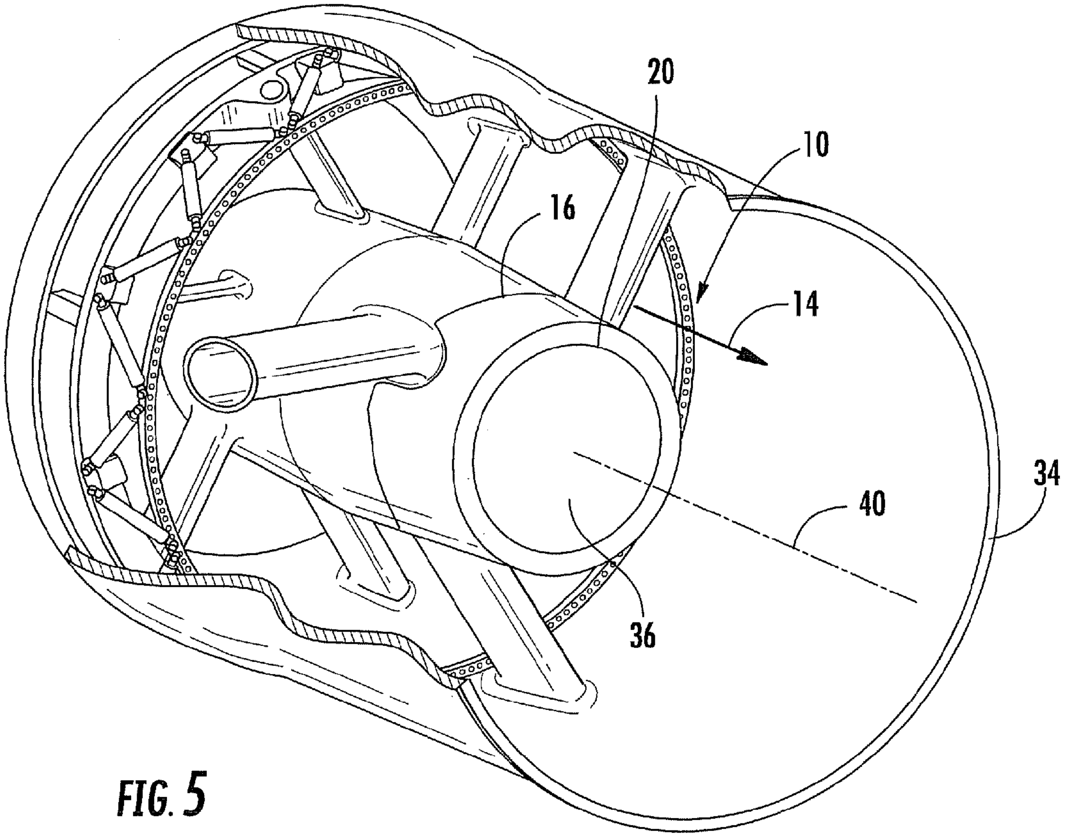
FIG. 5 is a perspective view of a flow ramp of the turbine exhaust diffuser adjustment system.

As shown in FIG. 5, the second flow ramp 44 may be generally cylindrical about a longitudinal axis 40 of the turbine engine 12 and may extend generally along the longitudinal axis 40. The second flow ramp 44 may be in the shape of a ring with a generally conical outer surface 26.

The second flow ramp 44 may be positioned downstream from the first flow ramp 38. The first flow ramp 38 may be positioned on a portion of the hub 36 forming the ID flowpath boundary 20 with a positive slope moving in a downstream direction, and the second flow ramp 44 may be positioned on a portion of the hub 36 forming the ID flowpath boundary 20 with a negative slope moving in a downstream direction. The first flow ramp 38 may be positioned on an upstream portion 50 of the hub 36 forming the ID flowpath boundary 20 with a positive slope of between about one and about six degrees, and in at least one embodiment may be about two degrees moving in a downstream direction. The second flow ramp 44 may be positioned on a downstream portion 52 of the hub 36 forming the ID flowpath boundary 20 with a negative slope of between about zero degrees and about nine degrees, and in at least one embodiment, may be about six degrees moving in a downstream direction.

The second flow ramp 44 may be adjustable such that an angular position 24 of the radially outer surface 26 of the second flow ramp 44 may be adjusted relative to the ID flowpath boundary 20, thereby enabling the flowpath 28 to be changed during turbine operation and enabling the flow 14 through the flowpath 28 to be redirected to increase the efficiency of a downstream diffuser. The second flow ramp 44 may be adjustable with any component or multiple components capable of changing the angular position 24 of the radially outer surface 26 while the turbine engine is at rest and under operating conditions. The second flow ramp 44 may be formed from any appropriate configuration.

During use, the flow ramp 16 may be used to redirect the flow 14 in the flowpath 28 defined by the ID flowpath boundary 20 and the OD flowpath boundary 34, as modified by one or more flow ramps 16. The flow ramp 16 may be adjustable such that the angular position 24 may be changed to change the redirection of exhaust gases near the ID flowpath boundary 20 towards the OD flowpath boundary 34. For instance, a hub strong pressure profile tends to pull flow away from the exhaust diffuser OD flowpath near the OD flowpath boundary 34 and can cause flow separation at that location, which can significantly reduce diffuser performance. The performance of a diffuser operating with a hub strong pressure profile and low swirl can be improved through use of one or more flow ramps 16 that redirects a portion of the flow 14 towards the OD flowpath boundary 34 to relieve separation at the OD flowpath boundary 34. The one or more flow ramps 16 may help balance the downstream radial total pressure profile. The variability of the angular position 24 of the flow ramps 16 enables the effect of the flow ramps 16 to be adjusted to account for different diffuser inlet conditions at different engine loads.

In another example, such as turbine operation during cold day conditions, the pressure profile can become even more hub strong and could benefit from one or more flow ramps 16 with steeper pitches. In another example, on a hot day, base load conditions for the pressure profile tend to become less hub strong, and thus, could benefit from flow ramps 16 having reduced angular positions 24 with a reduced slope.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. A turbine exhaust diffuser adjustment system for a gas turbine engine, comprising:

at least one flowpath downstream of at least one turbine combustor;

wherein the at least one flowpath is defined at least in part by a turbine casing forming an OD flowpath boundary;

wherein the at least one flowpath is defined at least in part by a hub forming an ID flowpath boundary;

a first flowpath reducer positioned in the at least one flowpath on the ID flowpath boundary, wherein the first flowpath reducer includes a downstream, radially outward point that extends radially outward further from the ID flowpath boundary than an upstream, radially outward point that is position upstream from the downstream, radially outward point; and wherein the first flowpath reducer is adjustable such that an angular position of a radially outer surface of the first flowpath reducer may be adjusted relative to the ID flowpath boundary, thereby enabling the flowpath to be changed during turbine operation.

2. The turbine exhaust diffuser adjustment system of claim 1, wherein the first flowpath is generally cylindrical about a longitudinal axis of the turbine engine.

3. The turbine exhaust diffuser adjustment system of claim 1, wherein the downstream, radially outward point of the first flowpath reducer extends radially outward from a longitudinal axis a distance greater than the upstream, radially outward point.

4. The turbine exhaust diffuser adjustment system of claim 1, wherein the first flowpath reducer is a ring with a generally conical outer surface.

5. The turbine exhaust diffuser adjustment system of claim 1, further comprising a second flowpath reducer positioned in the at least one flowpath, wherein the second flowpath reducer includes a downstream, radially outward point that extends radially outward further from the ID flowpath boundary than an upstream, radially outward point that is position upstream from the downstream, radially outward point.

6. The turbine exhaust diffuser adjustment system of claim 5, wherein the downstream, radially outward point of the flowpath extends radially outward from a longitudinal axis a distance greater than the upstream, radially outward point of the flowpath.

7. The turbine exhaust diffuser adjustment system of claim 5, wherein the second flowpath reducer is a ring with a generally conical outer surface.

8. The turbine exhaust diffuser adjustment system of claim 5, wherein the second flowpath reducer is positioned downstream from the first flowpath reducer.

9. The turbine exhaust diffuser adjustment system of claim 8, wherein the first flowpath reducer is positioned on an upstream portion of the hub forming the ID flowpath boundary with a positive slope moving in a downstream direction, and the second flowpath reducer is positioned on a downstream portion of the hub forming the ID flowpath boundary with a negative slope moving in a downstream direction.

10. The turbine exhaust diffuser adjustment system of claim 5, wherein the second flowpath reducer is adjustable such that an angular position of a radially outer surface of the second flowpath reducer may be adjusted relative to the ID flowpath boundary, thereby enabling the flowpath to be changed during turbine operation.

11. A turbine exhaust diffuser adjustment system for a gas turbine engine, comprising:

at least one flowpath downstream of at least one turbine combustor;

wherein the at least one flowpath is defined at least in part by a turbine casing forming an OD flowpath boundary;

wherein the at least one flowpath is defined at least in part by a hub forming an ID flowpath boundary;

a first flowpath reducer positioned in the at least one flowpath, wherein the first flowpath reducer includes a downstream, radially outward point that extends radially outward further from the ID flowpath boundary than an upstream, radially outward point that is position upstream from the downstream, radially outward point;

wherein the first flowpath reducer is generally cylindrical about a longitudinal axis of the turbine engine;

wherein the downstream, radially outward point of the first flowpath reducer extends radially outward from a longitudinal axis a distance greater than the upstream, radially outward point; and wherein the first flowpath reducer is adjustable such that an angular position of a radially outer surface of the first flowpath reducer may be adjusted relative to the ID flowpath boundary, thereby enabling the flowpath to be changed during turbine operation.

12. The turbine exhaust diffuser adjustment system of claim 11, wherein the first flowpath reducer is a ring with a generally conical outer surface.

13. The turbine exhaust diffuser adjustment system of claim 11, further comprising a second flowpath reducer positioned in the at least one flowpath, wherein the second flowpath reducer includes a downstream, radially outward point that extends radially outward further from the ID flowpath boundary than an upstream, radially outward point that is position upstream from the downstream, radially outward point, and wherein the second flowpath reducer is positioned downstream from the first flowpath reducer.

14. The turbine exhaust diffuser adjustment system of claim 13, wherein the downstream, radially outward point of the first flowpath extends radially outward from a longitudinal axis a distance greater than the upstream, radially outward point of the first flowpath.

15. The turbine exhaust diffuser adjustment system of claim 13, wherein the second flowpath reducer is a ring with a generally conical outer surface.

16. The turbine exhaust diffuser adjustment system of claim 15, wherein the first flowpath reducer is positioned on a portion of the hub forming the ID flowpath boundary with a positive slope of about two degrees moving in a downstream direction, and the second flowpath reducer is positioned on a portion of the hub forming the ID flowpath boundary with a negative slope of about six degrees moving in a downstream direction.

17. The turbine exhaust diffuser adjustment system of claim 13, wherein the second flowpath reducer is adjustable such that an angular position of a radially outer surface of the second flowpath reducer may be adjusted relative to the ID flowpath boundary, thereby enabling the flowpath to be reduced during turbine operation.

18. A turbine exhaust diffuser adjustment system for a gas turbine engine, comprising:

at least one flowpath downstream of at least one turbine combustor;

wherein the at least one flowpath is defined at least in part by a turbine casing forming an OD flowpath boundary;

wherein the at least one flowpath is defined at least in part by a hub forming an ID flowpath boundary;

a first flowpath reducer positioned in the at least one flowpath, wherein the first flowpath reducer includes a downstream, radially outward point that extends radially outward further from the ID flowpath boundary than an upstream, radially outward point that is position upstream from the downstream, radially outward point;

wherein the first flowpath is generally cylindrical about a longitudinal axis of the turbine engine;

wherein the downstream, radially outward point of the first flowpath reducer extends radially outward from a longitudinal axis a distance greater than the upstream, radially outward point;

wherein the first flowpath reducer is adjustable such that an angular position of a radially outer surface of the first flowpath reducer may be adjusted relative to the ID flowpath boundary, thereby enabling the flowpath to be reduced during turbine operation;

a second flowpath reducer positioned in the at least one flowpath, wherein the second flowpath reducer includes a downstream, radially outward point that extends radially outward further from the ID flowpath boundary than an upstream, radially outward point that is position upstream from the downstream, radially outward point, and wherein the second flowpath reducer is positioned downstream from the first flowpath reducer; and wherein the downstream, radially outward point of the first flowpath extends radially outward from a longitudinal axis a distance greater than the upstream, radially outward point of the first flowpath.

* * * * *